United States Patent [19]
Brady

[11] Patent Number: 5,794,048
[45] Date of Patent: Aug. 11, 1998

[54] METHOD FOR CLASSIFICATION OF YEAR-RELATED DATA FIELDS IN A PROGRAM

[75] Inventor: James T. Brady, San Jose, Calif.

[73] Assignee: MatriDigm Corporation, Fremont, Calif.

[21] Appl. No.: 705,499

[22] Filed: Aug. 29, 1996

[51] Int. Cl.[6] .................. G06F 9/30; G06F 17/30
[52] U.S. Cl. .................. 395/705; 395/701; 395/708; 395/377; 707/1; 707/100
[58] Field of Search .................. 395/376, 377, 395/500, 705, 701, 708; 368/28; 707/1, 6, 100, 2, 101

[56] References Cited

U.S. PATENT DOCUMENTS

| | | | |
|---|---|---|---|
| 4,908,759 | 3/1990 | Alexander, Jr. et al. | 707/101 |
| 5,222,052 | 6/1993 | Salame | 368/28 |
| 5,594,899 | 1/1997 | Knudsen et al. | 707/2 |
| 5,600,836 | 2/1997 | Alter | 707/101 |
| 5,630,118 | 5/1997 | Shaughnessy | 707/1 |
| 5,644,762 | 7/1997 | Soeder | 707/6 |
| 5,668,989 | 9/1997 | Mao | 707/101 |
| 5,682,535 | 10/1997 | Knudsen | 395/701 |
| 5,701,502 | 12/1997 | Baker et al. | 395/500 |

OTHER PUBLICATIONS

Letter to David N. Koffsky, May 14, 1996, from Donald F. Olker with attached Search Report (6 pages).
(A) Results of Database Search (7 pages).
(B) Results of Database Search (12 pages).
(C) Results of Database Search (24 pages).
(D) Results of Database Search (10 pages).

*Primary Examiner*—Emanuel Todd Voeltz
*Assistant Examiner*—Cuong H. Nguyen
*Attorney, Agent, or Firm*—Ohlandt, Greeley, Ruggiero, & Perle

[57] ABSTRACT

The method of the invention enables a computer to examine a software application, which includes operands and operators, and to identify operand fields which include a year value. An operand association table is provided for each operator and indicates, based upon inter-relationships of operands associated with the operator, whether an associated operand that has been classified as a year field or a probable year field, should be assigned a revised classification and what that revised classification should be. The method reviews the application to identify each operand which can be initially classified as a year field or a probable year field and lists each such operand in an operand table. The method also reviews the application to identify every operator listed therein and lists every operator and any associated operands in an operator table. Thereafter, the method determines, for operator entries located in the operator table, and from operands associated therewith and an operand association table, whether the classification for each respective operand in the operand table should or should not be altered.

10 Claims, 4 Drawing Sheets

FIG. 3.
OPERATOR TABLE

| OPERATOR (VERB) | OPERAND I | OPERAND II | OPERAND III | CLASSIFICATIONS | | |
|---|---|---|---|---|---|---|
| | | | | OPND I | OPND II | OPND III |
| ↑ 36 | ↑ 38 | ↑ 40 | ↑ 42 | ↑ 44 | ↑ 46 | ↑ 48 |

FIG 4A.

100 — ALLOCATE MEMORY SPACE FOR OPERAND & OPERATOR TABLES

102 — SCAN DATA DEFINITION SEGMENT OF APPLICATION AND IDENTIFY EACH OPERAND, ITS FORMAT AND ASSIGN INITIAL CLASSIFICATION OF FIELD AS (1) YEAR, (2) PROBABLE YEAR OR (3) NON-YEAR

104 — INSERT FINDINGS INTO OPERAND TABLE

106 — PARSE PROCEDURE PORTION OF APPLICATION AND IDENTIFY EVERY FIELD WITH AN OPERATOR AND THE OPERATOR

108 — LIST IN OPERATOR TABLE EVERY OPERATOR FIELD, OPERATOR, ASSOCIATED OPERANDS AND INITIAL CLASSIFICATIONS FROM OPERAND TABLE

METHOD FOR CLASSIFICATION OF YEAR-RELATED DATA FIELDS IN A PROGRAM

FIELD OF THE INVENTION

This invention relates to a method for avoiding calculation ambiguities which result from the use of year dates from the year 2000 and forward and, more particularly, to an improved method for finding year-related data fields in a program to enable their later alteration into an improved year format.

BACKGROUND OF THE INVENTION

Software applications use dates in many operations, from complex financial transactions to the calculation of expiration dates of drivers' licenses and credit cards. Many such applications base their calculations on dates and subtract two-digit year values to arrive at a calculation result. For example, calculations of interest on a 5-year certificate of deposit involve the subtraction of the certificate's issue date from the current date and a determination of interest based upon the difference value. This calculation is not a problem if the certificate matures in 1999, but if it matures in 2001, the same computation can result in an error message or worse. In the year 2000, the two-digit year indication starts over at "00" and unless something distinguishes such date, the year will appear to be the year 1900—or so it will seem to many programs that use only the year's last two digits for dates.

In the early days of data processing, storage space was at a premium and it was decided to use two digits for the year indication. Most programs today carry forward that format and employ two bytes of 8-bit binary data to indicate the last two-decimal values of the year. Many of these programs/applications were written years ago and the authors/programmers who understood their organization and details are no longer available for consultation. Further, calculations employing year fields are often deeply embedded in very large program routines and are thus difficult to find and identify.

The key to identifying year fields in a program, at a reasonable cost, is to do so automatically and avoid the use of programmers to scan the code.

Year fields are normally composites of sub-fields. That is, the fields used to represent "year", "month" and "day" are sub-fields of a larger field of "date". To identify such fields, two scan techniques are currently being used. The first examines the labels assigned to various data fields used by the program. In COBOL, these labels are found in the Data division which is the area of the program which defines each of the data elements used in the program. Using various techniques, key phrases like "year", "yr", etc. are located in the labels. These data fields are then considered to be year-oriented fields. As a further check, the format of each such "year-oriented" field is determined and is scanned to see if it meets one of the commonly used formats for year information. The most common format in use involves three two-digit numbers that are defined consecutively.

The application of this dual test allows a search of a program to be carried out and often leads to the discovery of approximately 80% of the year fields. Because such a search procedure does not consider the interrelationship of a discovered year field with other year fields, both in the same program and in allied programs in the same application, data that would allow a more accurate year field determination is ignored.

Accordingly, it is an object of this invention to provide an improved method for identifying year-related fields in a program.

It is another object of this invention to provide an improved method for identifying year-related fields in a program, which employs data available in associated fields to assure a higher level of accuracy in the year field identification process.

SUMMARY OF THE INVENTION

The method of the invention enables a computer to examine a software application composed of one or more programs, which includes operand labels and logical or computational operators, and to identify operand fields which include a year value. An operand association table is provided for each operator and indicates, based upon interrelationships of operands associated with the operator, whether an associated operand that has been classified as a year field, a probable year field or a non-year field, should be assigned a revised classification and what that revised classification should be. The method reviews the application to identify each operand which can be initially classified as a year field, a probable year field and lists each such operand in an operand table. The method also reviews the application to identify every operator listed therein and lists every operator and any associated operands in an operator table. Thereafter, the method determines, for operator entries located in the operator table, and from operands associated therewith and an operand association table, whether the classification for each respective operand in the operand table should or should not be altered.

DETAILED DESCRIPTION OF THE INVENTION

Figure 1:
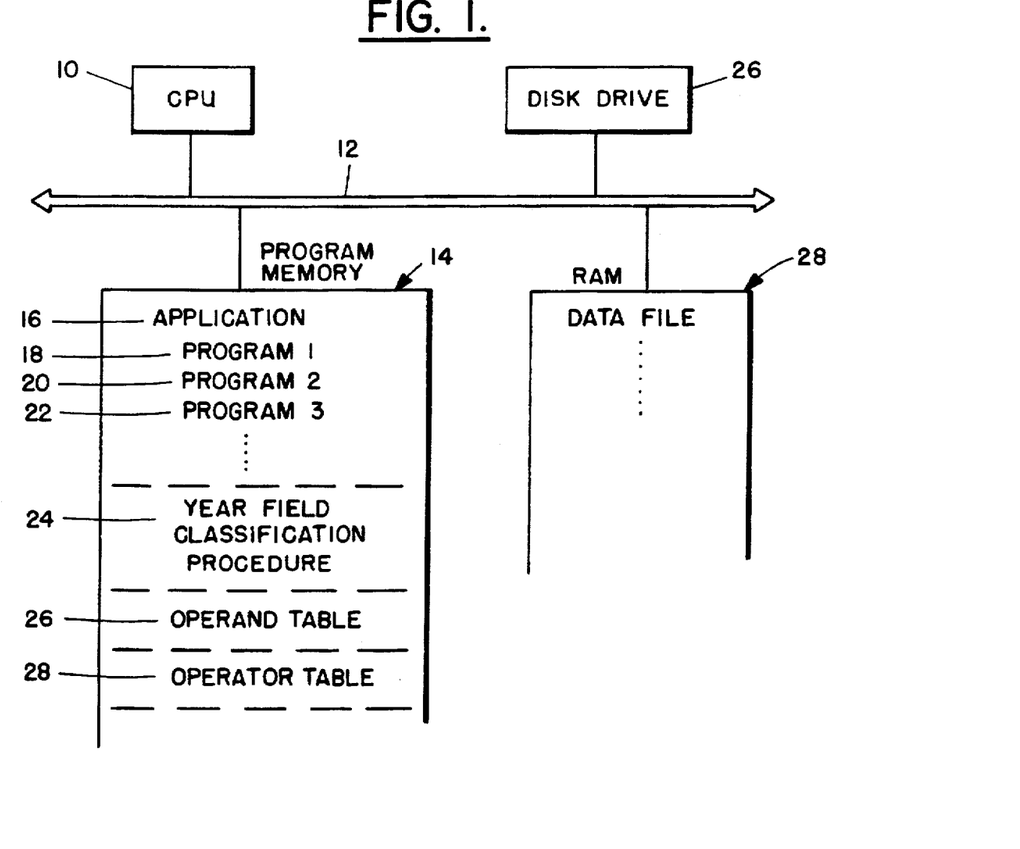
FIG. 1 is a block diagram of a computer system which is adapted to perform the method of the invention.

FIG. 1 illustrates a computer system adapted to carry out the method of the invention. A central processing unit (CPU) 10 is coupled via a bus system 12 to a program memory 14 which includes an application 16 which, in turn, comprises plural component programs 18, 20, 22, etc. Program memory 14 further includes a year field classification procedure 24 and two tables, an operand table 26 and an operator table 28. Year field classification procedure 24 is loaded into program memory 14 from disk drive 26, into which an appropriate magnetic disk entry device has been inserted. A further memory 28 provides storage for data files that are employed with application 16 and component programs 18, 20, 22 etc.

The usage of the term "year field" hereafter will refer to a field within application 16 (or any of its component programs) which holds or will hold a year value. A data field classified as a "year field" will be a field that is, with high probability, a field which contains a year indication. A data field classified as a "probable year field" refers to a field which may include a year designation, with some given level of probability. A data field classified as a non-year field refers to a field that currently has a very low probability of being a year field.

Year field classification procedure 24 initially constructs a data base from all of the component programs in application 16 and employs an operand table (FIG. 2). an operator table (FIG. 3), and a plurality of operand association tables (Tables B–E below) to enable the performance of the year field classification procedure. Initially the application program code is parsed and each data definition label is placed into a first operand table. Each operator and associated operands from the parsed code are placed into an operator table. The operand table contains space that is used to indicate the classification of each operand and whether the classification of the operand has changed since the last time it was analyzed (e.g., a flag).

Initially, the application is scanned to identify year fields, probable year fields and non-year fields. The year fields are then used as a starting point for a complete analysis of the application to identify most, if not all, of the year fields used in the application.

Figure 2:
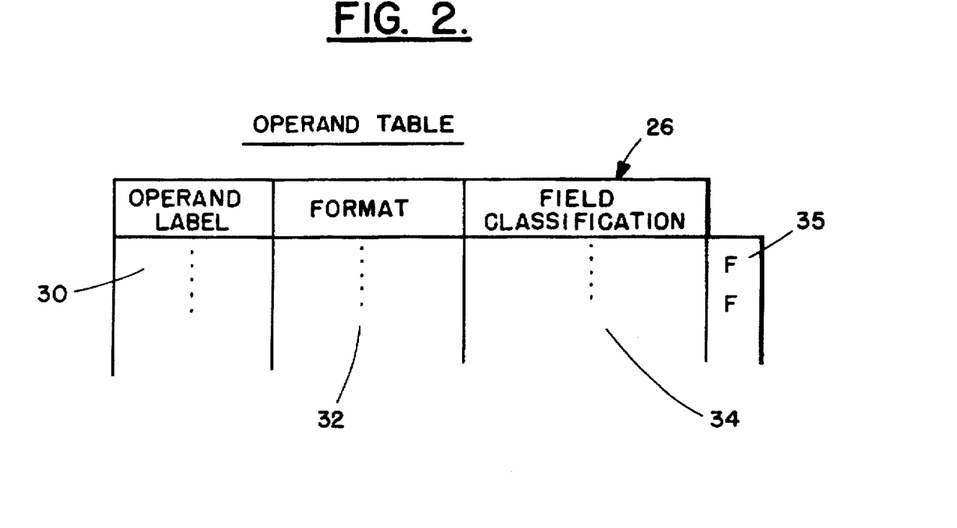
FIG. 2 is a schematic representation of an operand table employed with the method of the invention.
Figure 3:
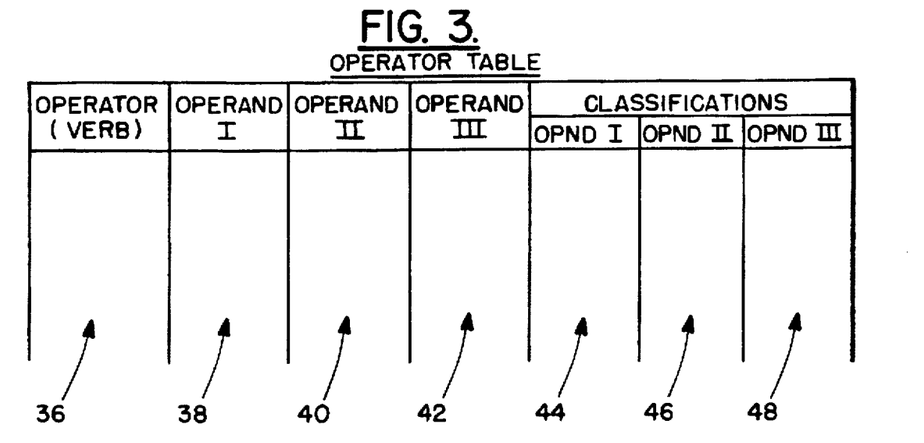
FIG. 3 is a schematic representation of an operator table employed with the method of the invention.

Turning to FIGS. 2 and 3, the tables employed during the analysis of the application will be described. In FIG. 2, operand table 26 is schematically illustrated. Operand table 26 includes a listing 30 of each operand that is present in application 16. Assuming that application 16 is written in COBOL, the operands are derived from the data definitions section of the program. A format column 32 is associated with each operand and defines the format of the field. For instance, if the label includes an indicator "PIC 99", a type of display format is indicated; if the label includes the phrase "COMP", a binary word format is indicated, ... etc. A third column 34 of operand table 26 is occupied by a probability value which indicates whether the operand is classified as a year, a probable year, or a non-year. A fourth column 35 indicates if any reclassification has occurred.

As will hereafter be understood, each operand is initially classified as to its year "type" through use of one or more prior art analysis techniques. Thereafter, each operand that is classified as a year is subjected to further tests, in accord with the invention hereof, which enables a refinement of the classification, and a resulting more accurate classification indication.

Operator table 28 (FIG. 3) is utilized by the method of the invention and lists in column 36 every operator found in application 16. Along with each operator, is listed one or more associated operands (i. e., operands I–III in columns 38, 40 and 42, respectively), along with a current classification of each of the aforesaid operands in columns 44, 46 and 48.

Operand column 30 and format column 32 in operand table 26 and operator and operand columns 36, 38, 40 and 42 in operator table 28 are built during the initial parsing operation of application 16. Thereafter, any of a plurality of known search procedures can be employed to assign an initial year classification to each operand in operand table 26. For instance, the characteristics that can be used to establish the initial classification of a year field are:

1. An operand label which indicates a year. For instance, key phrases like "year", "Yr", located in the label provide such an indication.

2. The operand label is constructed in a data format that is compatible with a year indication. For instance, a following COBOL code fragment appearing in the data division is indicative of the format used to indicate a year value.

| 10 | YEAR-OF-BIRTH | |
| 15 | YEAR-OF-BIRTH | PIC 99 |

-continued

| 15 | MONTH-OF-BIRTH | PIC 99 |
| 15 | DAY-OF-BIRTH | PIC 99 |

The variable "year-of-birth" includes 4 labels that indicate year, two format elements that indicate year, and one ordering that indicates year. The format elements are the six numeric digits that make up "year-of-birth", and the subdivision of the six digits into three groups of two digits. The ordering is the sequence of labels that are in a common year order, namely, "year", "month", and "day".

If a voting procedure is employed to enable the initial classification, the classification score for the variable shown above is 7 and its sub-fields would also have a score of 7. This is the maximum score a field can achieve, using such a scoring process. If a score exceeds 7, it is set to 7. For other formats, the score will be less than 7 which can be normalized to a value between 0.1 and 0.9 to provide a probability indicator that the operand comprises a probable year field.

As will be hereafter understood, a plurality of further tables are employed in the further analysis of the operands to enable a more precise classification to be assigned. A selection of the tables will be described hereinbelow. Table A is indicative of the fact that certain constants are associated with date calculations. Table A includes examples of most of these. The use of such a constant in certain kinds of calculations is an indicator that a variable is year-related.

| Constant | Usage | Operators Involved |
|---|---|---|
| 1–11 | Month of Fiscal Year End | Comparison, Addition |
| 4 | Leap Year Test | Division |
| 7 | Days in a week | Comparison, Addition, Subtraction |
| 8 | Days in a week + 1 | Comparison |
| 12 | Months in a year | Comparison, Addition, Subtraction |
| 13 | Months in a year + 1 | Comparison |
| 28 | Days in a Month (Feb) | Comparison, Addition, Subtraction |
| 29 | Days in a Month (Feb) | Comparison, Addition, Subtraction |
| 30 | Days in a Month | Comparison, Addition, Subtraction |
| 31 | Days in a Month | Comparison, Addition, Subtraction |
| 100 | Leap Year Test | Division |
| 365 | Days in a Year | Comparison, Addition, Subtraction |
| 366 | Days in a Year | Comparison, Addition, Subtraction |
| 367 | Days in a Year + 1 | Comparison |
| 400 | Leap Year Test | Division |
| 4000 | Leap Year Test | Division |

As can be noted from an examination of Table A, if a numeral, for example "30", is associated with a comparison, addition or subtraction operator, an initial presumption can be made that the variable is year-related. As a further example, the value "400" is often used to test whether a year is a leap year (in a division action). Thus, the presence of one of the constants indicated in Table A provides one indicator that an associated operand field is year-related.

"Comparison" association operator Table B below is indicative of the situation when a pair of fields are associated with a comparison command. If Field 1 and Field 2 are initially classified as year fields, then a post-analysis classification, as judged by the association of the fields, will always indicate year fields for both Field 1 and Field 2. If, however, Field 1 is classified as a probable year field and Field 2 is classified as a year field, then the post analysis classification of Field 1 changes from probable year to year, as there few, if any, situations where any value other than another year is compared with a further year value.

TABLE B

Comparison Operator

| Initial Classification | | Post Analysis Classification | |
|---|---|---|---|
| Field 1 | Field 2 | Field 1 | Field 2 |
| Year | Year | Year | Year |
| Year | Probable | Year | Year |
| Year | Not Year | Year | Year |
| Probable | Year | Year | Year |
| Probable | Probable | F 1 = (F 1 + F 2)/2 | F 2 = (F 1 + F 2)/2 |
| Probable | Not Year | Not Year | Not Year |
| Not Year | Year | Year | Year |
| Not Year | Probable | Not Year | Not Year |
| Not Year | Not Year | Not Year | Not Year |

In the classification noted in Table B, and other tables to follow, a Field 1 is denoted as (F__1); Field 2 as (F__2); and Field 3 as (F__3). Note also from Table B that "not year" classifications can be changed to a "year" classification when a comparison operator requires such a field to be compared with a year field.

Association Tables C and D below are, respectively, used with addition operators and subtraction operators and logically relate initial classifications of associated operand fields to post analysis classifications of the same fields. It is important to understand that while fields 1 and 2 may be present in a first component program within the application. Field 3 is often present in another component program within the application. Any analysis of individual component program listings, without taking into account the inter-relationships between the listings, overlooks valuable information which aids in achieving substantially higher accuracies of year field classification. The logical association of all of the inter-related fields that result from the utilization of operand table 26 operator table 28 and the various association tables (to be further described below) provides a high probability that all year-related fields are discovered and are properly classified. It is further to be noted that, in the main, the use of the association tables enables probable year field initial classifications to be changed to either a non-year classification or to a year classification and a non-year classification to be changed to either a probable year or a year classification.

The logic which enables the construction of the addition association table and subtraction association table shown below is readily apparent to those skilled in the art. Each line of each table is logically constructed in accordance with common usages in known programming environments.

TABLE C

Addition Operator

| Initial Classification | | | Post Analysis Classification | | |
|---|---|---|---|---|---|
| Field__1 | Field__2 | Field__3 | Field__1 | Field__2 | Field__3 If Present |
| Year | Year | — | Year | Year | — |
| Year | Probable | — | Year | Year | — |
| Year | Not Year | — | Year | Year | — |
| Probable | Year | — | Probable | Year | — |
| Probable | Probable | — | Probable | Probable | — |
| Probable | Not Year | — | Not Year | Not Year | — |
| Not Year | Year | — | Not Year | Year | — |
| Not Year | Probable | — | Not Year | Probable | — |
| Not Year | Not Year | — | Not Year | Not Year | — |
| Year | Year | Any | Year | Year | Year |
| Year | Probable | Year | Year | Not Year | Year |
| Year | Probable | Probable | Year | Not Year | Year |
| Year | Probable | Not Year | Year | Nat Year | Year |
| Year | Not Year | Year | Year | Not Year | Year |
| Year | Not Year | Probable | Year | Not Year | Year |
| Year | Not Year | Not Year | Year | Not Year | Year |
| Probable | Year | Year | Not Year | Year | Year |
| Probable | Year | Probable | Probable | Year | Year |
| Probable | Year | Not Year | Probable | Year | Year |
| Probable | Probable | Year | F__1 = (F__1 + F 2)/2 | F__2 = (F__1 + F 2/2 | Year |
| Probable | Probable | Probable | Probable | Probable | Probable |
| Probable | Probable | Not Year | Fd 1 = F 1/2 | F 2 = F 2/2 | Not Year |
| Probable | Not Year | Year | Year | Not Year | Year |
| Probable | Not Year | Probable | Probable | Not Year | Probable |
| Probable | Not Year | Not Year | Not Year | Not Year | Not Year |
| Not Year | Year | Year | Not Year | Year | Year |
| Not Year | Year | Probable | Not Year | Year | Year |
| Not Year | Year | Not Year | Not Year | Year | Year |
| Not Year | Probable | Year | Not Year | Year | Year |
| Not Year | Probable | Probable | Not Year | MAX (F__2, F 3) | MAX (F__2, F 3) |
| Not Year | Probable | Not Year | Not Year | Not Year | Not Year |
| Not Year | Not Year | Year | Probable Year F__1 = 0.5 | Probable Year F__2 = 0.5 | Year |
| Not Year | Not Year | Probable | Not Year | Not Year | Not Year |
| Not Year | Not Year | Not Year | Not Year | Not Year | Not Year |

TABLE D

Subtraction operator

| Initial Classification | | | Post Analysis Classification | | |
|---|---|---|---|---|---|
| Field_1 | Field_2 | Field_3 | Field_1 | Field_2 | Field_3 If Present |
| Year | Year | — | Year | Year | — |
| Year | Probable | — | Year | Year | — |
| Year | Not Year | — | Year | Year (Note 1) | — |
| Probable | Year | — | Year | Year | — |
| Probable | Probable | — | Probable | Probable | — |
| Probable | Not Year | — | Not Year | Not Year | — |
| Not Year | Year | — | Not Year | Year | — |
| Not Year | Probable | — | Not Year | Probable | — |
| Not Year | Not Year | — | Not Year | Not Year | — |
| Year | Year | Year | Error | Error | Error |
| Year | Year | Probable | Year | Year | Not Year |
| Year | Year | Not Year | Year | Year | Not Year |
| Year | Probable | Year | Year | Not Year | Year |
| Year | Probable | Probable | Year | | |
| Year | Probable | Not Year | Year | Year | Not Year |
| Year | Not Year | Year | Year | Not Year | Year |
| Year | Not Year | Probable | Year | Not Year | Year |
| Year | Not Year | Not Year | Year | Not Year | Year |
| Probable | Year | Year | Not Year | Year | Year |
| Probable | Year | Probable | Probable | Year | Probable |
| Probable | Year | Not Year | Year | Year | Year |
| Probable | Probable | Year | Probable | Probable | Year |
| Probable | Probable | Probable | Probable | Probable | Probable |
| Probable | Probable | Not Year | Fd 1 = F 1/2 | F 2 = F 2/2 | Not Year |
| Probable | Not Year | Year | Year | Not Year | Year |
| Probable | Not Year | Probable | Probable | Not Year | Probable |
| Probable | Not Year | Not Year | Not Year | Not Year | Not Year |
| Not Year | Year | Year | Not Year | Year | Year |
| Not Year | Year | Probable | Not Year | Year | Year |
| Not Year | Year | Not Year | Not Year | Year | Year |
| Not Year | Probable | Year | Not Year | Year | Year |
| Not Year | Probable | Probable | Not Year | MAX (F_2, F_3) | MAX (F_2, F 3) |
| Not Year | Probable | Not Year | Not Year | Not Year | Not Year |
| Not Year | Not Year | Year | Not Year | Year | Year |
| Not Year | Not Year | Probable | Not Year | Not Year | Not Year |
| Not Year | Not Year | Not Year | Not Year | Not Year | Not Year |

Note 1: This indicates the year in 9's complement form.

As shown below, a division operator association Table E is utilized. It is generally used only for fields classified as year fields and Field 3 is the numerical remainder of the operation. The test for Field 3 is an IF statement that is executed subsequent to the divide operation.

TABLE E

Division Operator

| Initial Classification | | | Post Analysis Classification |
|---|---|---|---|
| Field 1 | Field 2 | Field 3 | Field 2 |
| Constant of 4, 100, 400 or 4000 | Year | Tested for 0 | Year |
| Constant of 4, 100, 400 or 4000 | Probable Year | Tested for 0 | Year |
| Constant of 4, 100, 400 or 4000 | Non-year | Tested for 0 | = MAX (.5, 1− ((1−F 2)/2)) |

To illustrate the use of Table E, the following code listing for a leap year determination is provided. The leap year test is determined in Field 3.

```
SET Leap-Year EQUAL TO FALSE
DIVIDE 4 INTO Year GIVING Temp REMAINDER Leap-Year-Test
IF Leap-Year-Test EQUAL 0 THEN
    SET Leap-Year TO TRUE
    DIVIDE 100 INTO Year GIVING Temp REMAINDER Leap-Year-Test
    IF Leap-Year-Test EQUAL 0 THEN
        SET Leap-Year TO FALSE
        DIVIDE 400 INTO Year GIVING Temp REMAINDER Leap-Year-Test
        IF Leap-Year-Test EQUAL 0 THEN
            SET Leap-Year TO TRUE
            DIVIDE 4000 INTO Year GIVING Temp REMAINDER Leap-Year-Test
            IF Leap-Year-Test EQUAL 0 THEN
                SET Leap-Year TO FALSE
            END IF
        END IF
    END IF
END IF
```

Association Table F is used when a move operator is present.

TABLE F

| Initial Classification | | Move Operator Post Analysis Classification | |
|---|---|---|---|
| Field_1 | Field_2 | Field_1 | Field_2 |
| Year | Year | Year | Year |
| Year | Probable | Year | Year |
| Year | Not Year | Year | Year |
| Probable | Year | Year | Year |
| Probable | Probable | MAX (F_1, F_2) | MAX (F_1, F_2) |
| Probable | Not Year | Not Year | Not Year |
| Not Year | Year | Not Year | Year |
| Not Year | Probable | Not Year | Not Year |
| Not Year | Not Year | Not Year | Not Year |

Figure 4A:
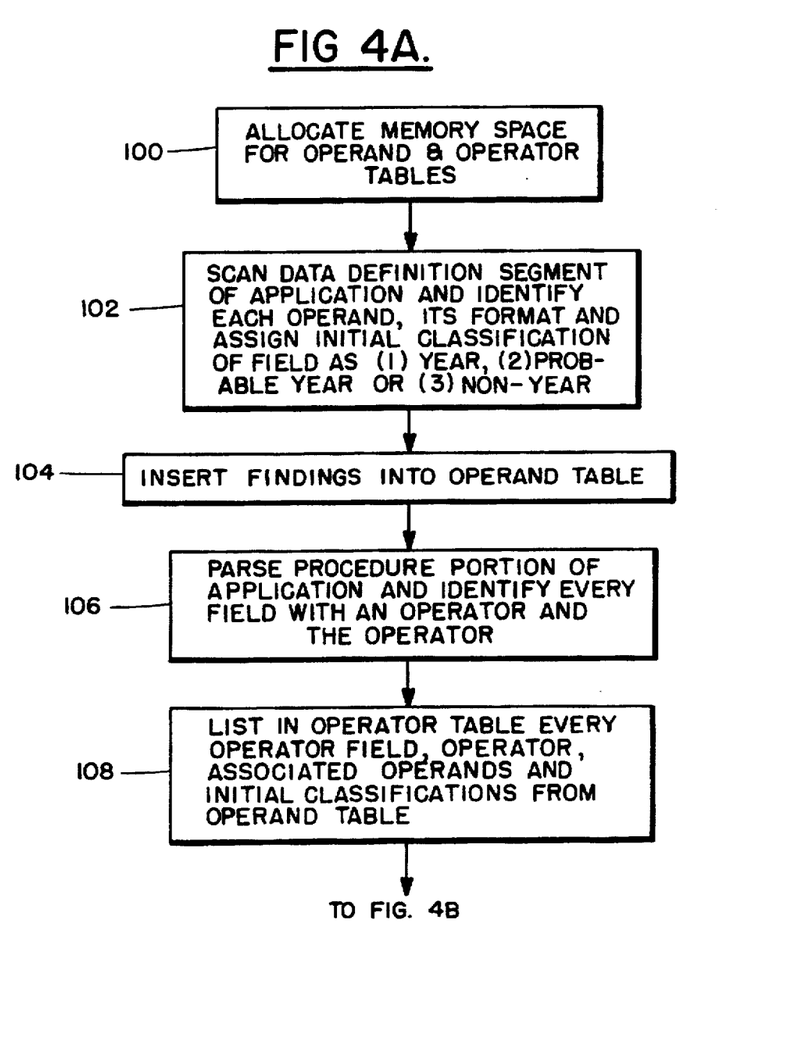
FIGS. 4a–4c illustrate a flow diagram of the method of the invention.
Figure 4B:
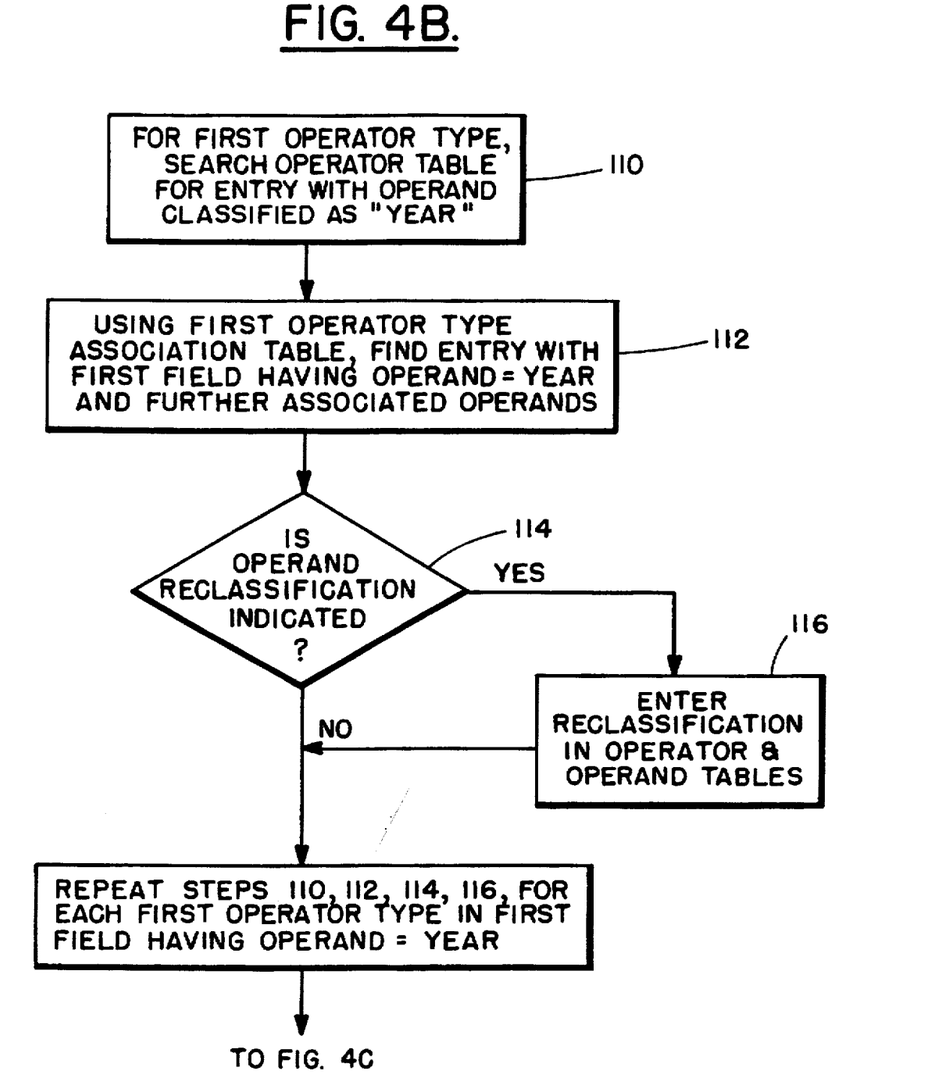
Figure 4C:
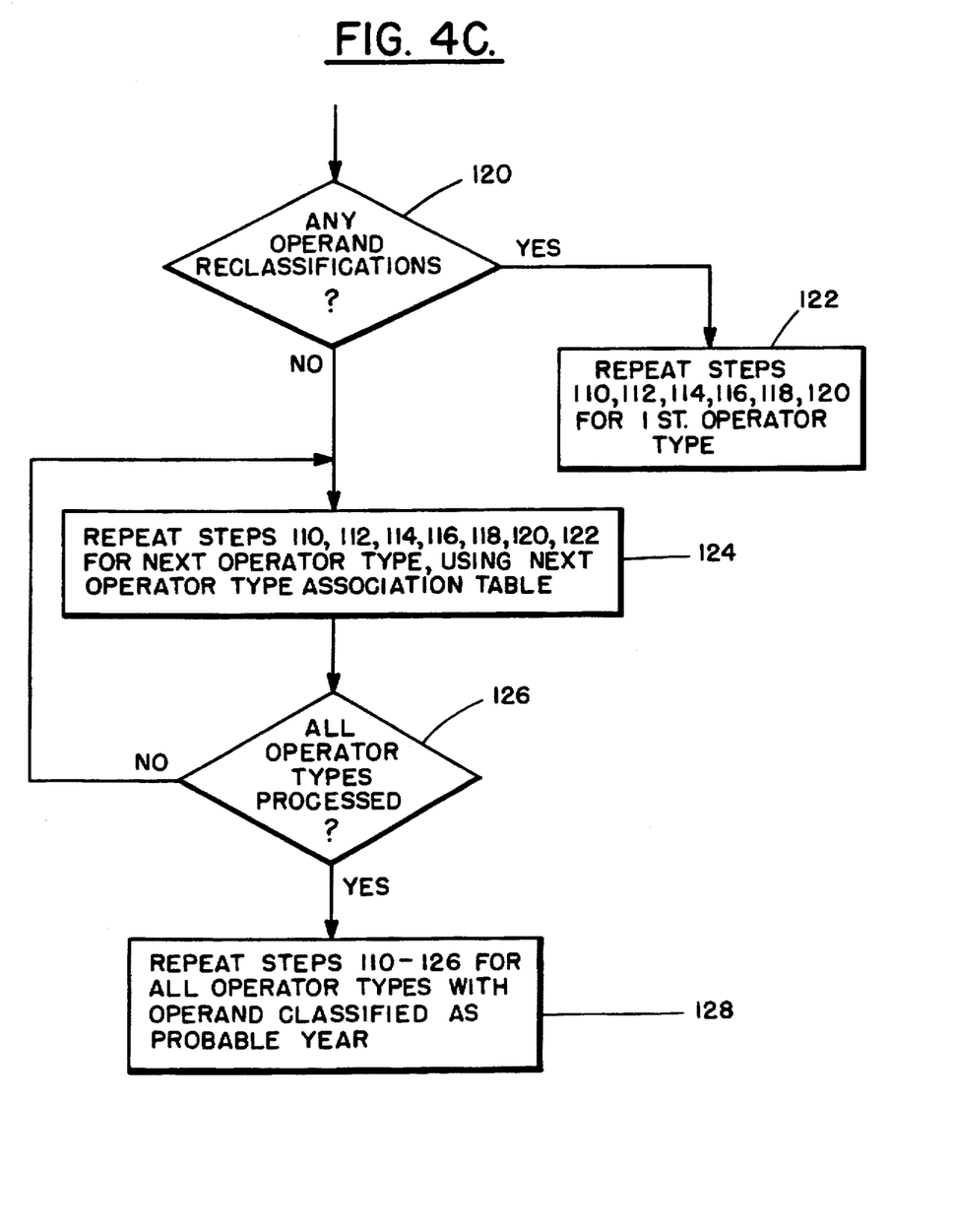

Turning now to FIGS. 4a–4c, the detailed operation of the method of the invention will be described. Initially, as shown in FIG. 4a, memory space is allocated for operand table 26 and operator table 28 in program memory 14 (box 100). Thereafter, the data definition segment of application 16 (and any programs associated therewith) is scanned and each operand listed therein is identified, and its format is determined. From the label and its format, an initial classification is assigned, i.e., as to whether it initially appears to be a year field, a probable year field, or a non-year field (box 102). The flags in reclassification column 35 are reset. As described above, the initial classifications are accomplished through use of known methods of analysis. The results of the scan of the data definition segment are inserted into operand table 26 (box 104).

Thereafter, the procedure portion of application 16 and its associated programs is parsed; and every field with an operator is identified, as is the operator (box 106). Next (box 108), operator table 28 is built by listing every operator found in the procedure portion of the application, along with the operands identified therewith. The initial classifications of each operand from operand table 26 are also inserted into operator table 28.

At this stage, operand table 26 and operator table 28 are complete, with operand table 26 including a listing of each operand and an initial field classification thereof, and operator table 28 including a listing of every operator in application 16 and its associated operands, along with initial classification indications thereof.

Turning to FIG. 4b, the procedure now turns to a refinement of the initial classification of each of the operands to arrive at a more accurate classification thereof. The procedure commences by examining all operators of a first type, e.g., move operators, and the associated operands found in operator table 28. In the first portion of the procedure, operator entries whose Field 1 initial classification indicates a year classification are processed. Once all such operator entries of the first type have been examined, all entries of a next operator type with a Field 1 year classification are searched, etc. until all operator types and their associated operands have been analyzed. Thereafter, the procedure is repeated for operators having a Field 1 initial classification of probable year.

In further detail, operator table 28 is initially searched for a first entry therein of the chosen operator type with a Field 1 classification of "year" (box 110). Then (box 112), the operand association table for the operator is accessed and its "initial" classification column is searched to determine an entry therein with identical operand classifications as those operands associated with the chosen initial operator entry from operator table 28. When such an entry is found, the post analysis classification portion thereof is examined and if a field re-classification is indicated (i.e., by an entry for an operand in a post-analysis classification column that is different from the initial classification portion), the indicated operand reclassification is entered in both operator table 28 and operand table 26 (box 116), the associated reclassification flag set, and the procedure moves to box 118.

There, steps 110, 112, 114 and 116 are repeated for each first operator type entry in operator table 28 having a Field 1=year. After no further operator entries of the first type remain to be analyzed and only if no operand reclassifications are indicated as having been performed on the last iteration, does the procedure moves to box 124. Otherwise (box 122), steps 110, 112, 114, 116 and 118 are repeated for each first operator type entry in operator table 28 having Field 1=year. This repetition occurs because any reclassification of an operand can affect other related operands and may cause further reclassification actions on a succeeding iteration.

Note from the above that each classification of an operand is dependent upon both the operator with which it is associated and other operands present in the same operator entry. Those operands may be reside in the same program or may be from another program in the application. As a result of the steps shown in FIGS. 4a and 4b, there is a high probability that errors in the initial classification of operands associated with first operator entries will be corrected and that proper classifications will be reconfirmed.

Turning to FIG. 4c, steps 110–122 are now repeated for the next operator type with a Field 1=year, using an association table for the next operator type (box 124). Thereafter, when all operator types having a Field 1=year operand have been analyzed (box 126), the procedure repeats for all operator entries in operator table 28 having a Field 1 operand=probable year (box 128). This procedure will not discover more year classifications but will change the probabilities assigned to certain probable year entries to enable a more accurate decision to be made with respect to which entries require further analysis. In this regard, any probable year entry with a probability level below a set threshold value is listed in a "programmer attention" table for further analysis by the user.

The above-noted procedure enables identification of year fields with high probability, and thereafter enables each of those year fields to be automatically accessed and to have their year designation altered in such a manner as to enable a removal of the ambiguity which arises from the onset of the year 2000 and forward. A preferred method for revising the year format and for enabling the year conversion procedure is described in U.S. patent application Ser. No. 08/657,657 (attorney docket 835.0001 USU) entitled "Date Format and Date Conversion Procedure" to Brady. The disclosure of the aforementioned patent application is incorporated herein by reference.

Hereafter is a pseudo-code listing which carries out the procedure shown in the flow diagrams of FIGS. 4a–4c.

```
Loop Once On Each Operator (Move, Comparison,
Subtraction, Addition, Division)
    Set Current_First_Table_Entry to the first
    First_Table_Entry marked as Year
    Loop Until Year_State_Change=False
        Set Year_State_Change to False
        Loop Until All Second_Table_Entries using the
                    Current_First_Table_Entries's field
                    label or aliases are processed
            Set Current_Second_Table_Entry to the next
            (first) Second_Table_Entry using the
            Current_First_Table_Entry's labile or
            alias
            If Current_Second_Table_Entry_Operator=
            Current_Operator
                Then Process according to the
                corresponding operator table and if
                there is a change in a year's status,
                mark it as changed and
                Set Year_State_Change=True
            End if
        End Loop
    End Loop
    Comment: The following loop will not discover more
    years but will change the probability assigned to a
    probable year.
    Set Current_First Table_Entry to the first
    First_Table_Entry marked as Probable year
    Loop Until Year_State_Change=False
        Set Year_State_Change to False
        Loop Until All Second_Table Entries using the
        Current_First_Table_Entry's field label or
        aliases are processed
            Set Current_Second_Table_Entry to the next
            (first) Second Table_Entry using the
            Current_First_Table_Entry's label or alias
            If Current_Second_Table_Entry_Operator=
            Current_Operator
                Then Process according to the
                corresponding operator table and if
                there is a change in a year's
                probability mark it as changed and
                Set Year_State_Change=True
            End if
        End Loop
    End Loop
End Loop Once
```

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A computer implemented method for examining a software application including operands and operators, to identify operand fields therein which include a year value, said method including the steps of;

a) establishing operand association table means for logically determining, based upon interrelationships of operands associated with an operator, whether an operand having a classification as a year field, a probable year field or a non-year field should be assigned a revised classification;

b) reviewing said application to identify each operand in said application which can be classified as a year field or a probable year field and listing each operand thereby classified as a year field or a probable year field in an operand table;

c) reviewing said application to identify every operator listed therein and listing as an entry in an operator table, said every operator and any associated operands;

d) for each respective operand listed in said operand table, finding in said operator table each operator entry with which said respective operand is associated; and e) for each operator entry identified in step d), determining from: operand(s) associated therewith, said each respective operand, and said operand association table means, whether said classification for said each respective operand in said operand table should be altered.

2. The computer implemented method as recited in claim 1, wherein step a) establishes a special operand association table means for each operator type and step e) employs, for each operator of said operator type for which said special operand association table means was established, said special operand association table means.

3. The computer implemented method as recited in claim 2, wherein steps d), e) are first performed for all operators of a first operator type and are then repeated, in succession, for all operators of second and additional types.

4. The computer implemented method as recited in claim 2, wherein steps d), e) are first performed for all operands classified as year fields and are then repeated for all operands classified as probable year fields.

5. The computer implemented method as recited in claim 2, wherein if any operand classification has been modified during steps d) and e), steps d) and e) are repeated, using current classifications for each respective operand entry in said operand table.

6. A memory means for use in conjunction with a computer, said memory means enabling said computer to examine a software application including operands and operators, to identify operand fields therein which include a year value, said computer including operand association table means for providing, based upon interrelationships of operands associated with an operator, indications of whether an operand having a classification as a year field or a probable year field should be assigned a revised classification and what said revised classification should be, said memory means comprising:

first means for enabling review of said application to identify each operand in said application which can be classified as a year field, a probable year field, or a non-year field and for enabling a listing of each operand thereby classified as a year field or a probable year field in an operand table;

second means for enabling review of said application to identify every operator listed therein and for listing as an entry in an operator table, said every operator and any associated operands;

third means for enabling location in said operator table, for each respective operand listed in said operand table, each operator entry with which said respective operand is associated; and fourth means for enabling determination, for each operator entry located in said operator table, from: operand(s) associated therewith, said each respective operand, and said operand association table means, whether said classification for said each respective operand in said operand table should be altered.

7. The memory means as recited in claim 6, wherein said operand association table means includes a special operand association table means for each operator type and said fourth means employs, for each operator of said operator type for which said special operand association table means was established, said special operand association table means.

8. The memory means as recited in claim 7, wherein said third means and fourth means operate upon all operators of a first operator type and then operate upon, in succession, all operators of second and additional types.

9. The memory means as recited in claim 7, said third means and fourth means operate upon all operands classified as year fields and then repeat for all operands classified as probable year fields.

10. The memory means as recited in claim 7, wherein if any operand classification has been modified by said fourth means, said third means and fourth means repeat their operations, using current classifications for each respective operand entry in said operand table.

* * * * *